INVENTOR.
L. J. KABELL
BY C. W. ROESCHKE
ATTORNEY

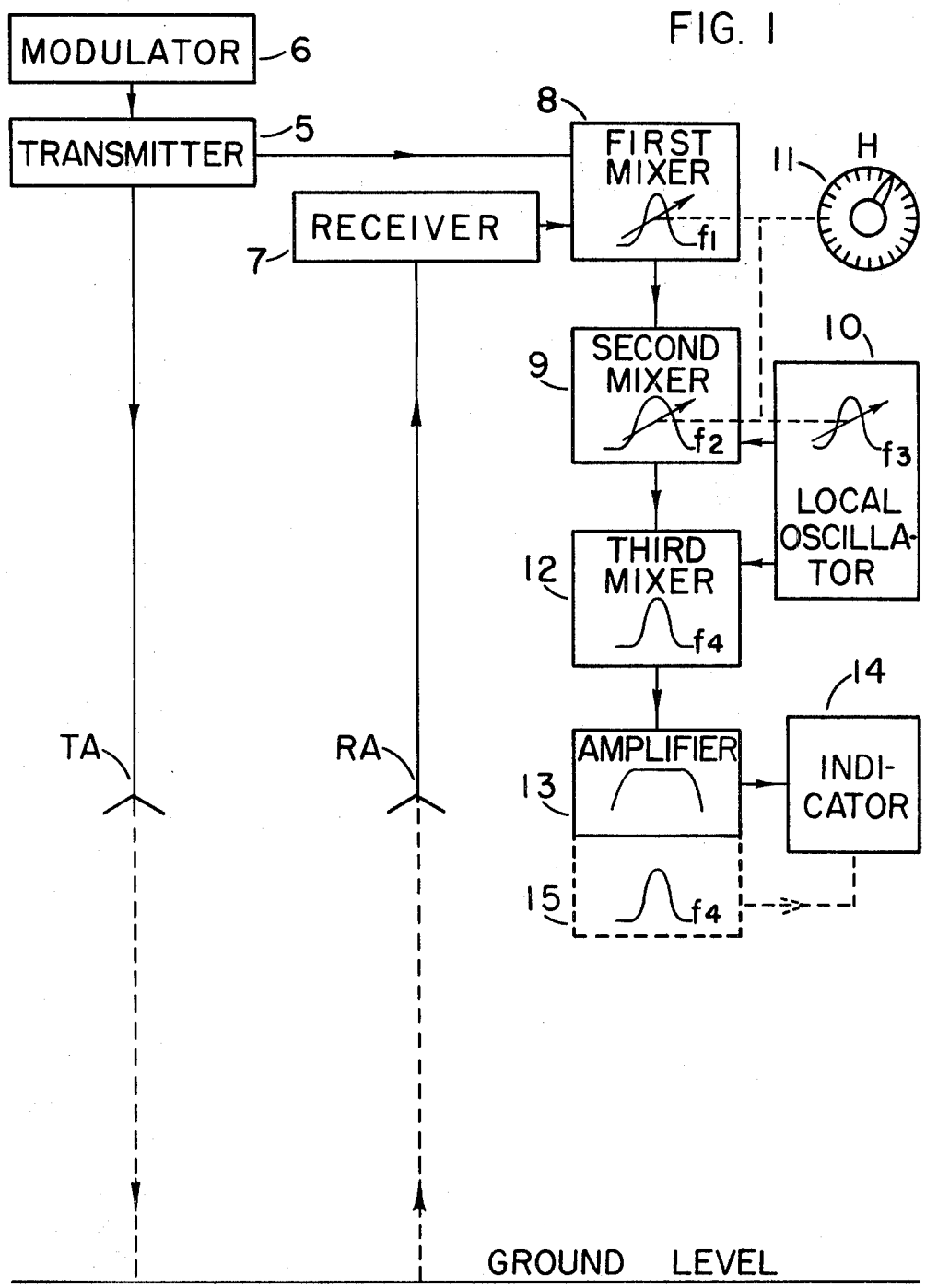

United States Patent Office 3,566,406
Patented Feb. 23, 1971

3,566,406
RADAR ALTIMETER
Louis J. Kabell and Conrad W. Roeschke, Albuquerque, N. Mex., assignors, by mesne assignments, to the United States of America as represented by the United States Atomic Energy Commission
Filed Dec. 15, 1952, Ser. No. 326,032
Int. Cl. G01s 9/24
U.S. Cl. 343—14         6 Claims This invention relates to an improved radio altimeter, especially useful in situations where interference or jamming or other radio transmission is present or anticipated.

The invention utilizes a transmitter of radio waves varied rapidly in frequency from a normal to a higher value and even more rapidly returned to normal; the repetition rate of this variation is also high. This in itself confers on the system of immunity to jamming by unwanted transmission of a single frequency or of a band of frequencies.

The immunity is made substantially complete as follows:

The transmitted wave is reflected from the ground or seal level and returns to meet a later transmitted wave of slightly higher frequency. The difference frequency is successively beaten down by a plurality of mixer circuits under the influence of a local oscillator to appear finally as a signal of much lower frequency, the same at all altitudes it is desired to indicate. The altitude to be indicated is selected and by a common control the tuning of mixer outputs and frequency of the local oscillator is so adjusted that at the selected altitude an indicating circuit, selectively responsive to the final low frequency signal, shall be operated. Or, if it is desired to ascertain the altitude at any moment, the common control is operated until response of the indicating circuit is obtained. The setting of the common control is then shown by the position of a pointer against a scale graduated in altitude.

The final low frequency signal, and also the intermediate signals, are momentarily interrupted at each return to normal frequency of the transmitted wave. By known methods, the indicating circuit is designed to operate only on a substantially continuous signal, and the interruptions above mentioned are tenths of microseconds in duration so that the indicator ignores them.

On the other hand, a jamming signal of either a single frequency or a band of frequencies can match the radio frequency over only a minute fraction of a cycle of variation thereof. Thus the desired signal has a continuity punctured by minute gaps; the undesired signal exists only for even shorter intervals and so is unable to actuate the indicator.

A general object of the invention is therefore to provide a radio altimeter immune to radio interference, either accidental or intentional.

Another object of the invention is to provide, in such an altimeter, means affording a plurality of rejections of any interfering signal.

Another object of the invention is to provide an altitude-indicating system wherein the indicating element is selectively responsive to an electrical signal of specified frequency.

Another object of the invention is to provide an electrical altimetric system whereby the attainment of a specified altitude is indicated or used to instigate the operation of a utilization circuit.

Obviously, the invention is useful for distance measurements generally, horizontal, vertical or oblique, wherever a transmitted wave can be reflected, at least in part, toward the proximity of the transmitter. Equally obviously, by introducing electroacoustic radiators and receivers in place of radio devices, together with appropriate changes in frequencies, a sonar range finder can be built utilizing the principles of the present invention.

How these objects, and others not particularized, are attained will be clear from the following description of an illustrative embodiment of the invention, read with reference to the accompanying drawings in which:

FIG. 1 is a block schematic of the system of the invention as used in a radio altimeter;

Figure 2A:
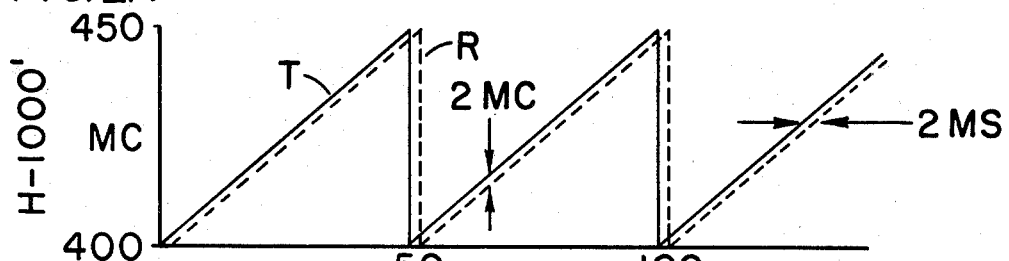
FIGS. 2A and 2B are graphs respectively illustrative of the time relationships of the transmitted and reflected waves at altitudes of 1000 and of 5000 feet.

Referring now to FIG. 1, 5 indicates a radio transmitter capable of being modulated in frequency by modulator 6, which produces an unsymmetrical saw-tooth voltage wave with gradual rise and nearly instantaneous return. In known manner this voltage wave is applied to vary cyclically the frequency generated in transmitter 5. Conveniently, this frequency may be initially 400 megacycles, varied linearly with time to 450 megacycles over an interval of 50 microseconds, returning to the initial frequency in a time of the order of a tenth microsecond.

The radio signal from transmitter 5 is radiated, preferably in a restricted cone, by transmitting antenna TA, to be reflected from the ground or the sea to receiving antenna RA. Receiver 7 then is supplied with a signal similar to but lower in frequency than the signal then being radiated from antenna TA, the frequency difference being the change in frequency of transmitter 5 in the time of travel of the wave to and back from the reflecting surface. If the altitude H of the vehicle carrying the system is 1000 feet this frequency difference is 2 megacycles. If H equals 12,500 feet the difference is 25 megacycles, and this is about the useful limit when the frequency of transmitter 5 varies 50 megacycles in 50 microseconds.

Figure 2B:
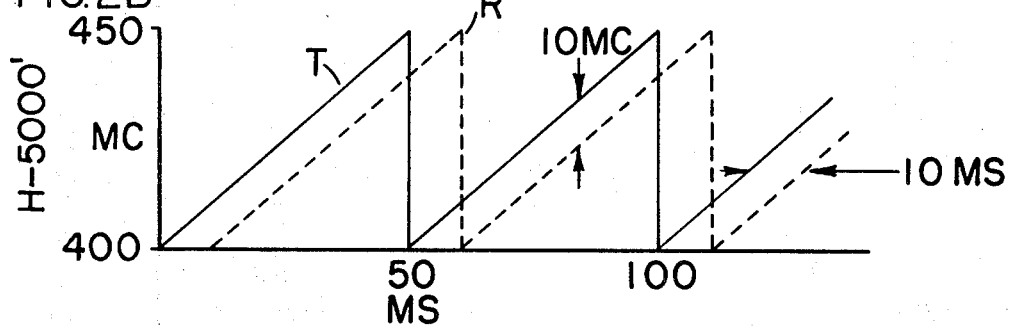

FIG. 2A graphically exhibits the relation at $H=1000$ feet between the transmitted wave T and the reflected wave R; in FIG. 2B is shown the like relation when $H=5000$ feet.

Suppose it is desired to indicate the attainment in ascent or descent of the altitude $H=1000$ feet. Here there is a delay of 2 microseconds between the transmission and the reception of a particular cycle of transmitter frequency variation. Height dial 11 will be set to 1000 (graduations omitted in FIG. 1) and will control shafts as indicated by dashed lines to mixers 8 and 9 and oscillator 12. Therewith the output circuits of mixers 8 and 9 will be tuned to 2 megacycles and 1.25 megacycles respectively, and local oscillator 10 will be adjusted to generate a continuous signal of 0.75 megacycle. Third mixer 12 has an output permanently tuned to 0.5 megacycle and amplifier 13 has an output circuit comprising either a band pass filter transmitting a band including 0.5 megacycle or, if preferred, a circuit 15 narrowly tuned to that frequency.

The transmitted wave of frequency 400 megacycles returns to receiver 7 at the moment transmitter 5 is emitting a frequency 402 megacycles, and so on. In mixer 8 there are continuously compared the two waves, that directly from transmitter 5 and that received by receiver 7. Mixer circuits 8 and 9 are purely conventional and are succeeded by tuned outputs variable under control of dial 11 as above stated. Mixer 8 thus passes freely only the 2 megacycle difference frequency to mixer 9, in which this difference frequency is compared with frequency 0.75 megacycle of local oscillator 10. The difference of these frequencies 2.00—0.75 or 1.25 megacycles, is freely transmitted to mixer 12 of which the output circuit is permanently tuned to 0.5 megacycle. In mixer 12 the output of mixer 9 is now compared with that of oscillator 10 and the frequency 0.5 megacycle results. This output wave, freely passed by the output circuit of mixer 12, is amplified in amplifier 13 and applied to indicator 14, which may advantageously but not indispensably be tuned to the 0.5 megacycle frequency supplied it.

It will be clear that there will be no output from mixer 12 and so no input to indicator 14 at any altitude other than that correspondent to 2 megacycles frequency difference between the signals supplied to mixer 8, that is, to the altitude 1000 feet. Indicator 14 may be a simple indicator giving a visual or auditory signal or may be a utilization circuit adapted to effect any desired operation on board the vehicle carrying the invention.

Figure 3:
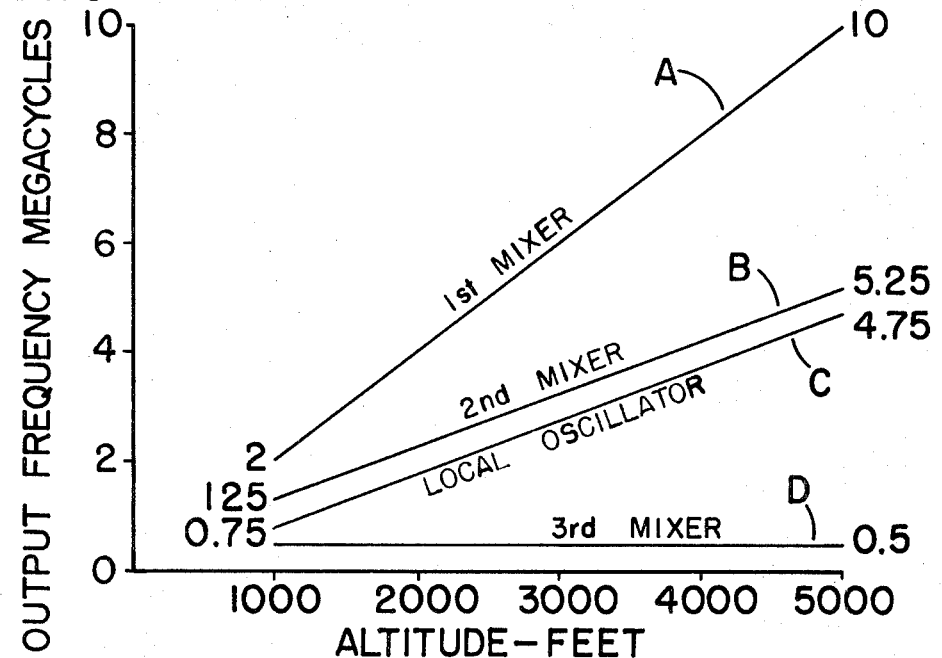
FIG. 3 illustrates the simultaneously effected variations in tuning of mixer circuits and local oscillator in the system of FIG. 1.

FIG. 3 shows how the output frequencies of mixers 8, 9 and 12 and of local oscillator 10 are varied with altitude according to the setting of dial H. Line A indicates that the frequency passed by mixer 8 varies from 2 to 10 megacycles as the altitude varies from 1000 to 5000 feet. Concomitantly therewith mixer 9 and oscillator 10 may, in transmitted and generated frequency, respectively, vary from 1.25 to 5.25 megacycles for mixer 9 and from 0.75 to 4.75 megacycles for oscillator 10, lines B and C. An ordinate on this chart, drawn at any altitude within the range of abcissas shown, intersects all the slant lines at the frequencies simultaneously requisite for indication of the altitude at which the ordinate is drawn.

It will be noted that at any ordinate the frequency difference between the first mixer 8 and the second mixer 9 is the frequency of local oscillator 10, while the unvarying frequency of third mixer 12 is the frequency difference between second mixer 9 and oscillator 10. These relations are features of the invention which enable the system of FIG. 1 to provide a triple rejection of unwanted signals, as will now be explained.

Assume that dial 11 is set to provoke an indication at 1000 feet, but the altitude is actually 3000 feet. The frequency difference between waves T and R of FIG. 2A is now 6 megacycles, practically wholly rejected by the output circuit of mixer 8. A minute amount of the 6 megacycle wave passing to mixer 9 mixes with the local oscillator frequency of 0.75 megacycle to furnish a 5.25 megacycle signal; this is almost wholly rejected by the output circuit of mixer 9. Again, in mixer 12 a vestige of the 5.25 megacycle signal, mixing with 0.75 megacycle output of oscillator 10, will produce a difference frequency of 4.5 megacycles, to be rejected by the 0.5 megacycle tuning of the output of mixer 12.

Thus no frequency to the input of mixer 8 perceptibly different from the frequency difference appropriate to the prescribed altitude can reach the indicating circuit 14. Even in the range of frequencies radiated from transmitting antenna TA, a fixed frequency or a band of frequencies will be unable to cause a false indication, because such an interfering signal will combine with the radiated or reflected signal for a substantially infinitesimal interval in each cycle of frequency variation, and indicator 14 is designed to ignore such. Jamming the system could not be done without complete knowledge of the radiated frequency, its range of variation and the repetition rate of such variation.

In the diagram of FIG. 1, the output circuits of mixers 8 and 9 and of oscillator 10 are sharply tuned to simultaneously variable frequencies $f_1$, $f_2$ and $f_3$ respectively That of mixer 12 is similarly tuned to a fixed frequency $f_4$, as may be also the dashed attenuation output 15 of amplifier 13. Where there is a lack of perfect stability of oscillator 10, it may be better to use the band pass filter shown in full line in amplifier 13; the lower and upper band limits may well be 0.49 and 0.51 megacycle, respectively. It may be calculated that a variation of ±0.01 megacycle in the frequency of the oscillator will mean less than one percent error in indicated altitude at 1000 feet and proportionally less at higher altitudes; it is an absolute error in altitude that is caused by the frequency instability of oscillator 10.

While the invention has been illustratively described in a radar system operating between 5000 feet and lower altitudes, it is obviously only a matter of arithmetic to adapt the invention to different altitudes and electrical specifications, the useful altitude being limited only by the requirement that in order to avoid ambiguity the frequency difference between transmitted and reflected waves should always be less than half the range of variation of transmitted frequency.

Moreover, the frequencies to which the various output circuits are tuned are only illustratively those stated in the foregoing description. It is desirable that the tuning frequency of the first mixer be at each altitude the corresponding difference frequency between the transmitted wave and the reflected wave simultaneously supplied to the first mixer, but latitude is permitted in the other tunings subject to the requirement that once having selected the frequency of the third mixer, that of the local oscillator and of the second mixer should be chosen to make that of the second mixer at each altitude equal the sum of those of the local oscillator and of the third mixer and at the same time equal the difference in frequency between the first mixer and the local oscillator. These relations are required whether the wave concerned is electromagnet or acoustic.

The application of the invention to produce a sonar distance measuring system, and the usefulness of such a system, will be obvious to those skilled in the art art of sonar or radar ranging.

We claim:

1. A radio altimeter for indicating the attainment of a specified altitude comprising means for generating a continuous radio signal of variable frequency, means for cyclically varying the frequency between selected limits, means for radiating toward a reflecting surface the signal so varied, means for receiving the reflected signal, a first, a second and a third mixer and an oscillator, the first and second mixers and the oscillator being provided with output circuits simultaneously tunable to selected frequencies while the output circuit of the third mixer is tuned to a fixed frequency, means for injecting into the first mixer the simultaneously appearing transmitted and reflected signals, means for injecting into the second mixer the output of the first mixer and that of the oscillator, means for injecting into the third mixer the output of the second mixer and that of the oscillator, means for tuning the output circuit of the first mixer to the difference frequency between the signals at the specified altitude and simultaneously the output circuits of the local oscillator and of the second mixer to frequencies of which the difference equals the output frequency of the third mixer and the sum equals the output frequency of the first mixer and means for indicating the appearance of a signal in the output of the third mixer.

2. A radio altimeter as in claim 1 wherein the output circuit of the second mixer is tuned to a frequency equal to the sum of the frequencies of the output circuits of the local oscillator and of the third mixer.

3. A radio altimeter as in claim 2 wherein the frequencies to which are tuned the several output circuits are in the following order from highest to lowest: first mixer; second mixer; local oscillator; third mixer.

4. A radio altimeter for ascertaining the altitude of a carrying vehicle comprising means for generating a continuous radio signal of variable frequency, means for cyclically varying the frequency between selected limits, means for radiating toward a reflecting surface the signal so varied, means for receiving the reflected signal, a first, a second and a third mixer and an oscillator, the first and second mixers and the oscillator being provided with output circuits simultaneously tunable to selected frequencies while the output circuit of the third mixer is tuned to a fixed frequency, means for injecting into the first mixer the simultaneously appearing transmitted and reflected signals, means for injecting into the second mixer the output of the first mixer and that of the oscillator, means for injecting into the third mixer the output of the second mixer and that of the oscillator, means for tuning simultaneously and proportionally to altitude the output circuits of the first and second mixers and the local oscillator to frequencies which for the second mixer always exceed that of the local oscillator by the frequency of the third mixer and for the first mixer always equal the sum of the frequencies of the second mixer and the local oscillator, means for indicating the appearance of an output signal from the third mixer, means for setting the tuning means to elicit such an output signal and means for indicating the setting in terms of altitude.

5. An altimeter for indicating the attainment of a specified altitude comprising means for generating a continuous signal of variable frequency, means for cyclically varying the frequency between selected limits, means for radiating toward a reflecting surface the signal so varied, means for receiving the reflected signal, a first, a second and a third mixer and an oscillator, the first and second mixers and the oscillators being provided with output circuits simultaneously tunable to selected frequencies while the output circuit of the third mixer is tuned to a fixed frequency, means for injecting into the first mixer the simultaneously appearing transmitted and reflected signals, means for injecting into the second mixer the output of the first mixer and that of the oscillator, means for injecting into the third mixer the output of the second mixer and that of the oscillator, means for tuning the output circuit of the first mixer to the difference frequency between the signals at the specified altitude and simultaneously the output circuits of the local oscillator and of the second mixer to frequencies of which the difference equals the output frequency of the third mixer and the sum equals the output frequency of the first mixer and means for indicating the appearance of a signal in the output of the third mixer.

6. An altimeter for ascertaining the altitude of a carrying vehicle comprising means for generating a continuous signal of variable frequency, means for cyclically varying the frequency between selected limits, means for radiating toward a reflecting surface the signal so varied, means for receiving the reflected signal, a first, a second and a third mixer and an oscillator, the first and second mixers and the oscillator being provided with output circuits simultaneously tunable to selected frequencies while the output circuit of the third mixer is tuned to a fixed frequency, means for injecting into the first mixer the simultaneously appearing transmitted and reflected signals, means for injecting into the second mixer the output of the first mixer and that of the oscillator, means for injecting into the third mixer the output of the second mixer and that of the oscillator, means for tuning simultaneously and proportionally to altitude the output circuits of the first and second mixers and the local oscillator to frequencies which for the second mixer always exceed that of the local oscillator by the frequency of the third mixer and for the first mixer always equal the sum of the frequencies of the second mixer and the local oscillator, means for indicating the appearance of an output signal from the third mixer, means for setting the tuning means to elicit such an output signal and means for indicating the setting in terms of altitude.

References Cited

UNITED STATES PATENTS

| | | | |
|---|---|---|---|
| 2,466,532 | 4/1949 | Carlson | 343—14 |
| 2,508,400 | 5/1950 | Kiebert | 343—14 |
| 2,518,864 | 8/1950 | Carlson | 343—14 |
| 2,632,161 | 3/1953 | Naday | 343—14 |

RODNEY D. BENNETT, Jr., Primary Examiner

M. F. HUBLER, Assistant Examiner